United States Patent
Wintner

(10) Patent No.: US 9,876,212 B2
(45) Date of Patent: Jan. 23, 2018

(54) BATTERY ASSEMBLY WITH LINEAR BUS BAR CONFIGURATION

(71) Applicant: Atieva, Inc., Menlo Park, CA (US)

(72) Inventor: Stephan Carl Wintner, San Francisco, CA (US)

(73) Assignee: ATIEVA, INC., Menlo Park, CA (US)

(*) Notice: Subject to any disclaimer, the term of this patent is extended or adjusted under 35 U.S.C. 154(b) by 0 days.

(21) Appl. No.: 15/610,759

(22) Filed: Jun. 1, 2017

(65) Prior Publication Data
US 2017/0271643 A1 Sep. 21, 2017

Related U.S. Application Data

(62) Division of application No. 14/802,207, filed on Jul. 17, 2015.

(51) Int. Cl.
| | |
|---|---|
| *H01M 4/00* | (2006.01) |
| *H01M 2/20* | (2006.01) |
| *H01M 10/6551* | (2014.01) |
| *H01M 10/625* | (2014.01) |
| *H01M 10/613* | (2014.01) |
| *H01M 10/653* | (2014.01) |
| *H01M 10/6556* | (2014.01) |
| *H01M 10/6554* | (2014.01) |
| *H01M 2/10* | (2006.01) |

(52) U.S. Cl.
CPC ......... *H01M 2/206* (2013.01); *H01M 10/613* (2015.04); *H01M 10/625* (2015.04); *H01M 10/653* (2015.04); *H01M 10/6551* (2015.04); *H01M 10/6554* (2015.04); *H01M 10/6556* (2015.04); *H01M 2/1077* (2013.01)

(58) Field of Classification Search
CPC ............... H01M 2/1077; H01M 2/206; H01M 2220/20; H01M 2/1094; H01M 2/105
See application file for complete search history.

(56) References Cited

U.S. PATENT DOCUMENTS

| | | | | |
|---|---|---|---|---|
| 5,418,083 | A * | 5/1995 | Tamaki ............... | H01M 2/1083 429/167 |
| 2002/0034087 | A1* | 3/2002 | Suzuki ................. | H02M 7/003 363/144 |
| 2002/0102457 | A1* | 8/2002 | Oogami ............... | B60L 3/0046 429/159 |
| 2009/0297892 | A1 | 12/2009 | Ijaz | |
| 2014/0255750 | A1* | 9/2014 | Jan ........................ | H01M 2/206 429/120 |
| 2016/0172642 | A1* | 6/2016 | Hughes ............... | H01M 2/1077 429/90 |

* cited by examiner

*Primary Examiner* — Mark F Huff
*Assistant Examiner* — Monique Wills
(74) *Attorney, Agent, or Firm* — Patent Law Office of David G. Beck

(57) ABSTRACT

A battery assembly utilizing a compact and robust bus bar configuration is provided. The batteries within the assembly are divided into groups, where the batteries within each battery group are connected in parallel and the groups are connected in series. The batteries are interconnected using a repetitive sequence of non-overlapping, alternating polarity bus bars. The bus bars, which are integrated into a battery assembly upper tray member, are devoid of contact fingers and positioned such that there is a single bus bar located adjacent to either side of each battery group.

14 Claims, 6 Drawing Sheets

BATTERY ASSEMBLY WITH LINEAR BUS BAR CONFIGURATION

CROSS-REFERENCE TO RELATED APPLICATION

This application is a divisional of U.S. patent application Ser. No. 14/802,207, filed 17 Jul. 2015, the disclosure of which is incorporated herein by reference for any and all purposes.

FIELD OF THE INVENTION

The present invention relates generally to battery packs and, more particularly, to a robust and compact design for a battery assembly bus bar configuration.

BACKGROUND OF THE INVENTION

A bus bar is a metal strip or bar that conducts electricity and is used for electrical power distribution. Battery cells can be connected with bus bars to make battery packs. Some battery packs using cylindrical cells make electrical connections to the tops and the bottoms of the cells. When connecting cells in series, bus bars and high current interconnects link the positive terminal of one cell, or a parallel group of cells, to the negative terminal of the next cell or the next parallel group of cells. Unfortunately, connections to the bottoms of the cells may prevent the efficient operation of either an air-based or a liquid coolant-based cooling system that is being used to remove the heat generated by the cells during operation. In addition, the high current interconnect from the bottoms of the cells to the bus bars, which may be in the form of a wire somewhat longer than the length of the cell, introduces a small amount of resistance which gives rise to a voltage drop at high current levels. Furthermore, assembly of this wire to the bus bars and/or to the bottom of each of the batteries adds to the manufacturing cost of the battery pack while potentially introducing reliability issues.

Accordingly, what is needed is a robust bus bar configuration that allows the efficient assembly of a battery pack system while not affecting operation of the battery pack thermal management system. The present invention provides such a bus bar design.

SUMMARY OF THE INVENTION

The present invention provides a battery assembly comprised of (i) a plurality of batteries where each battery includes both a first terminal and a second terminal accessible at a first end portion of the battery, where the plurality of batteries are divided into a plurality of battery groups with each battery group comprised of a subset of the batteries, where the batteries within each subset are electrically connected in parallel, and where the battery groups are electrically connected in series; (ii) an upper tray member, where the upper tray member captures the first end portion of each battery, and where the upper tray member includes a plurality of apertures that provide access to the first and second battery terminals of each battery; and (iii) a plurality of bus bars attached to an upper surface of the upper tray member, where the plurality of bus bars are non-overlapping, devoid of contact fingers, and configured in an alternating pattern with the plurality of battery groups, where the alternating pattern alternates a single bus bar with a single battery group such that only one bus bar is adjacent to either side of each battery group, where a first set of the bus bars are of a first polarity and a second set of the bus bars are of a second polarity, where the plurality of bus bars attached to the upper surface of the upper tray member alternate between the first polarity and the second polarity, where each battery of a corresponding battery group is electrically connected via the first terminal to one bus bar of the first set of bus bars adjacent to a first side of the corresponding battery group and electrically connected via the second terminal to one bus bar of the second set of bus bars adjacent to a second side of the corresponding battery group. Preferably the bus bars are linear and of approximately uniform thickness and of approximately uniform width. The upper surface of each bus bar may be coplanar with the upper surface of the upper tray member. The bus bars may be molded into, or bonded directly to, the upper surface of the upper tray member. The plurality of apertures corresponding to the upper tray member may be comprised of a single aperture per battery group, where the single aperture provides access to the first and second terminals of each battery of the corresponding battery group. Wire bonds may be used to electrically connect the batteries to the bus bars, where the wire bonds may utilize a bonding technique selected from the group consisting of ultrasonic bonding, resistance bonding, thermocompression bonding and thermosonic bonding.

In another aspect, the assembly may further include a battery separating member that includes a plurality of six-sided cavities that correspond to the plurality of batteries, where the first end portion of each battery extends out of a first side of the battery separating member and is captured by the upper tray member. Each side of each six-sided cavity may be straight and of equal length; alternately, each side of each six-sided cavity may curve inwards towards a corresponding cavity centerline; alternately, each side of each six-sided cavity may curve outwards away from a corresponding cavity centerline.

In another aspect, each of the batteries comprising the plurality of batteries may be cylindrical, for example utilizing an 18650 form factor. The first terminal of each of the batteries may be comprised of the battery positive terminal while the second terminal of each of the batteries may be comprised of the battery casing.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations or components, these steps, calculations or components should not be limited by these terms, rather these terms are only used to distinguish one step, calculation or component from another. For example, a first calculation could be termed a second calculation, and, similarly, a first step could be termed a second step, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of batteries electrically interconnected to achieve the desired voltage and capacity, where the battery assembly is typically contained within an enclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
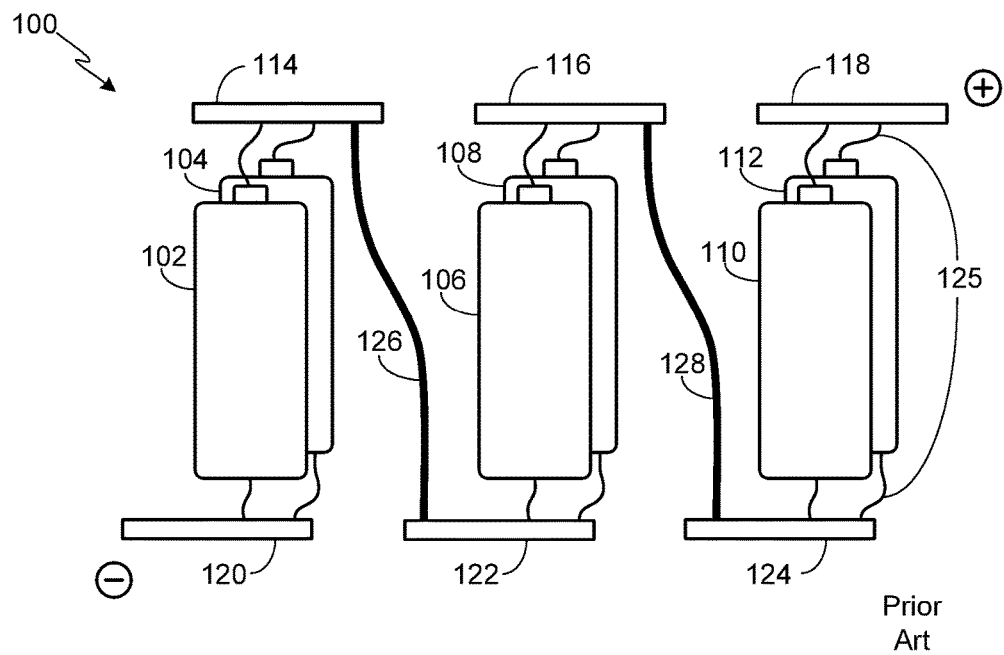
FIG. 1 provides a schematic diagram of a battery pack with bus bars above and below the battery cells in accordance with the prior art.

FIG. 1 illustrates a portion of an exemplary battery pack 100 that utilizes a common battery pack configuration. As shown, battery pack 100 includes a first group of batteries 102 and 104 connected in parallel, a second group of batteries 106 and 108 connected in parallel, and a third group of batteries 110 and 112 connected in parallel. The first, second and third groups of batteries are connected in series. Bus bars 114, 116, 118, 120, 122, 124 are used to connect the batteries in this parallel and series arrangement. Each of the bus bars is coupled to the respective batteries with one or more interconnects 125. A relatively thick wire 126 couples the second bus bar 114 to the third bus bar 122, making a series connection between the first and second battery groups, while a second relatively thick wire 128 couples the fourth bus bar 116 to the fifth bus bar 124, making a series connection between the second and third battery groups. As a result, the first bus bar 120 is the negative terminal while the sixth bus bar 118 is the positive terminal for battery pack 100.

The use of bus bars at both ends of the batteries as illustrated in FIG. 1 requires a relatively complex manufacturing process in order to (i) attach the battery interconnects 125 between the battery end surfaces and the bus bars, and (ii) attach the wires (e.g., wires 126 and 128) that couple the upper bus bars to the lower bus bars. Wires 126 and 128 are also problematic in the sense that they can introduce parasitic resistance into the current path, which in turn can introduce a voltage drop under high current drain conditions. Additionally this configuration prevents, or at least limits, the ability to efficiently remove battery pack heat by affixing a heat sink to a battery end surface.

Figure 2:
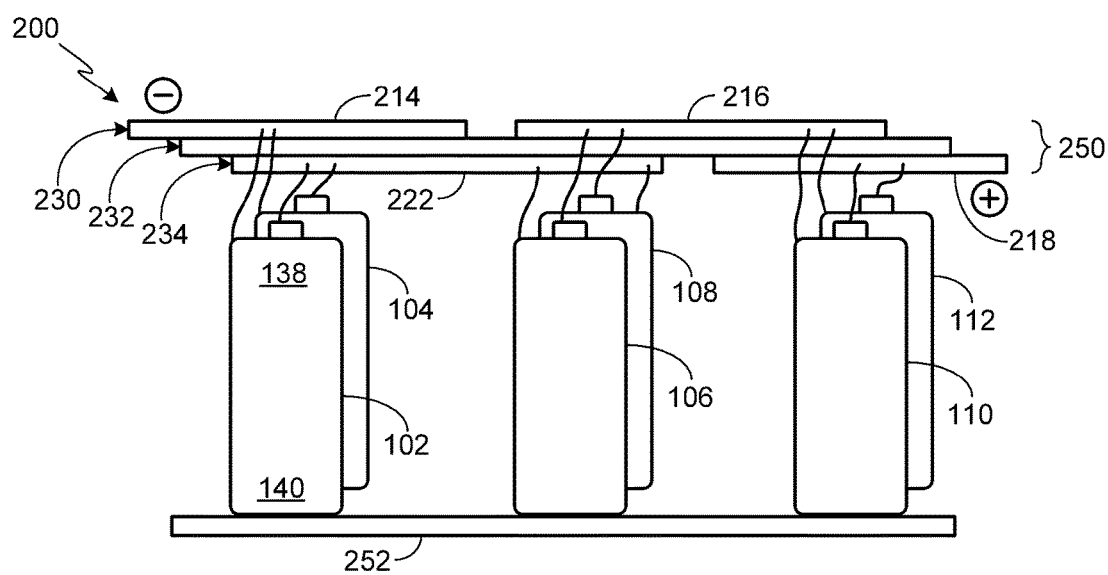
FIG. 2 provides a schematic diagram of a battery pack with both bus bars adjacent to one end of each of the battery cells in accordance with the prior art.

FIG. 2 illustrates a battery pack 200 utilizing an alternate battery pack configuration in which all the bus bars are proximate to one end of the battery pack, thus enabling efficient heat removal from the other end of the battery pack. Furthermore, by locating bus bars 214, 216, 218 and 222 proximate to one end of the batteries, fewer bus bars are required than in battery pack 100. The relatively thick wires 126 and 128 from the upper bus bars to the lower bus bars are also eliminated in the embodiment shown in FIG. 2.

Access to both the positive and negative terminals in battery pack 200 is at one end of the cells, i.e., at the top end of the cells, where the bus bars are coupled to the positive and negative terminals using battery interconnects. As in the prior arrangement, the first group of batteries 102 and 104 are connected in parallel, the second group of batteries 106 and 108 are connected in parallel, and the third group of batteries 110 and 112 are connected in parallel. The first, second and third groups of batteries are connected in series. Bus bars 214, 216, 218, 222 are used to couple the batteries in this parallel and series arrangement. Specifically, starting with the negative terminal of battery pack 200, a first bus bar 214 is connected to the negative terminals of the first group of batteries 102 and 104 while a second bus bar 222 is connected to the positive terminals of the same group of batteries 102 and 104, both at the top end portion 138 of each of the batteries. The first and second bus bars 214 and 222 couple the first group of batteries 102 and 104 in parallel. Similarly, the second bus bar 222 and the third bus bar 216 couple the second group of batteries 106 and 108 in parallel, while the third bus bar 216 and the fourth bus bar 218 couple the third group of batteries 110 and 112 in parallel. Series connections between battery groups are formed by the bus bars, specifically the second bus bar 222 connects the positive terminals of the first group of batteries 102 and 104 to the negative terminals of the second group of batteries 106 and 108; and the third bus bar 216 connects the positive terminals of the second group of batteries 106 and 108 to the negative terminals of the third group of batteries 110 and 112. The fourth bus bar 218 is the positive terminal of the battery pack 200.

In battery pack 200 the bus bars are arranged in a layer stack 250. In this stacking arrangement first bus bar 214 and third bus bar 216, which are separated by an air gap or other electrical insulator to prevent short circuiting, are placed in a first layer 230. Similarly, second bus bar 222 and fourth bus bar 218, which are also separated by a gap or insulator, are placed in a third layer 234. Disposed between layers 230 and 234 is an electrically insulating layer 232. To simplify fabrication, the layer stack may be formed using layers of a circuit board, e.g., with the bus bars made of (or on) copper layers or other suitable conductive metal (such as aluminum) and the insulating layer made of resin impregnated fiberglass or other suitable electrically insulating material.

The batteries shown in FIGS. 1 and 2, as well as the batteries used in the preferred embodiment of the invention, have a projecting nub as a positive terminal at the top end of the battery and a can, also referred to as a casing, that serves as the negative battery terminal. The batteries are preferably cylindrically shaped with a flat bottom surface (e.g., 18650 form factor). Typically a portion of the negative terminal is located at the top end of the cell, for example due to a casing crimp which is formed when the casing is sealed around the contents of the battery. This crimp or other portion of the negative terminal at the top end of the battery provides physical and electrical access to the battery's negative terminal. The crimp is spaced apart from the peripheral sides of the projecting nub through a gap that may or may not be filled with an insulator.

Preferably in a battery pack such as battery pack 200 in which the battery connections are made at one end of the cells (e.g., end portions 138), a heat sink 252 is thermally coupled to the opposite end portions 140 of each of the batteries. This approach is especially applicable to a coplanar battery arrangement which provides a relatively flat surface to attach a heat sink. Heat sink 252 may be finned or utilize air or liquid coolant passages. If heat sink 252 is air cooled, a fan may be used to provide air flow across one or more heat sink surfaces. In some configurations, heat sink 252 may be attached or affixed to the bottom of a battery holder.

In a typical battery pack in which all battery connections are made at one end of the cells, typically a multi-layer stack (e.g., stack 250) is used in order to provide bus bars for both terminals as well as a suitable insulator located between the bus bars. This approach results in a relatively complex bus bar arrangement. For example FIG. 3 from co-assigned U.S. patent application Ser. No. 14/203,874, filed 11 Mar. 2014, illustrates a multi-layer bus bar configuration in which the bus bars are stacked with an interposed insulator, and in which each bus bar includes multiple contact fingers 301.

In order to simplify bus bar design and configuration, thereby significantly reducing material and fabrication costs as well as overall battery pack complexity, the present invention utilizes a series of non-overlapping, linear bus bars of alternating polarity. Although this approach may be used throughout the entire battery pack, preferably it is used to form battery modules, where the battery modules are then electrically coupled to form the battery pack. Assuming the battery pack is used in an electric vehicle as preferred, the individual battery modules may be contained within a single battery pack enclosure, or within multiple enclosures, the latter approach allowing subsets of modules to be distributed throughout the vehicle in order to obtain a particular weight distribution or to fit within the confines of a particular vehicle envelope or structure.

Figure 4:
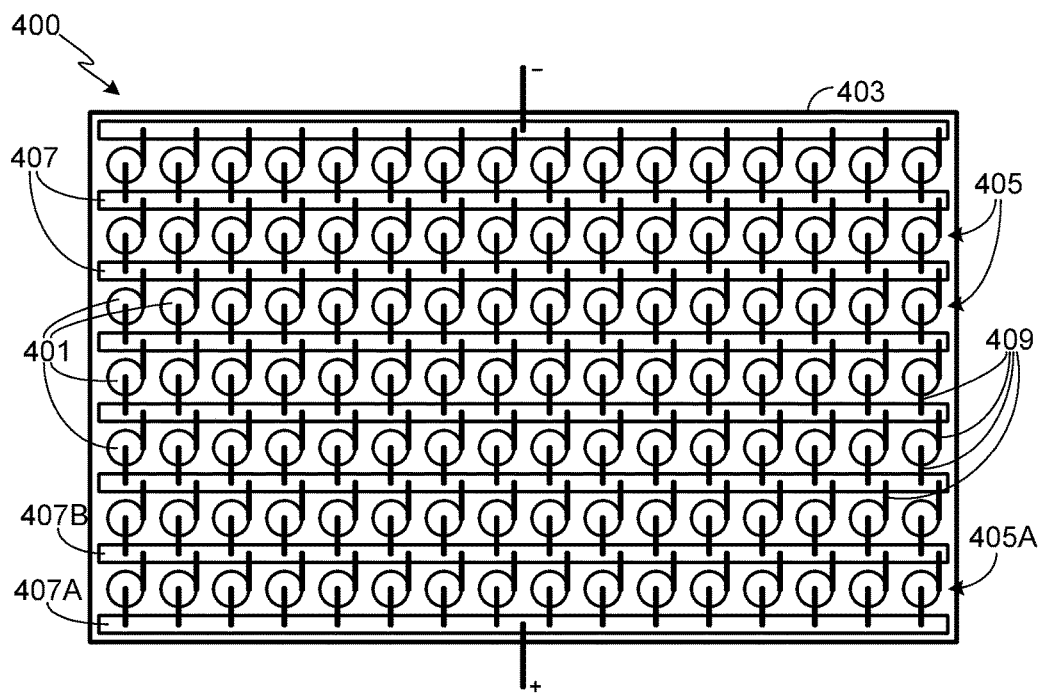
FIG. 4 provides a simplified view of a battery module in accordance with the present invention.

FIG. 4 provides a top view of a battery module 400 configured per the invention. In this embodiment, the end portion of a plurality of batteries 401 is visible, and accessible, through corresponding apertures in an upper tray member 403. Tray member 403 is prepared and/or treated to provide electrical isolation between batteries, for example by fabricating the tray member from an electrically insulative material such as a plastic, or coating the tray member with an electrically insulative material. The batteries are divided into a plurality of rows 405, where each row 405 includes sixteen batteries 401. Even though module 400 is shown with seven rows 405, it should be understood that the invention is not limited to configurations utilizing this number of battery rows, and therefore is equally applicable to configurations utilizing a fewer number, or a greater number, of battery rows 405. Similarly, the invention is not limited to configurations in which each battery row is comprised of sixteen batteries, rather the invention may be used with configurations using a fewer number, or a greater number, of batteries 401 per battery row 405.

Figure 3:
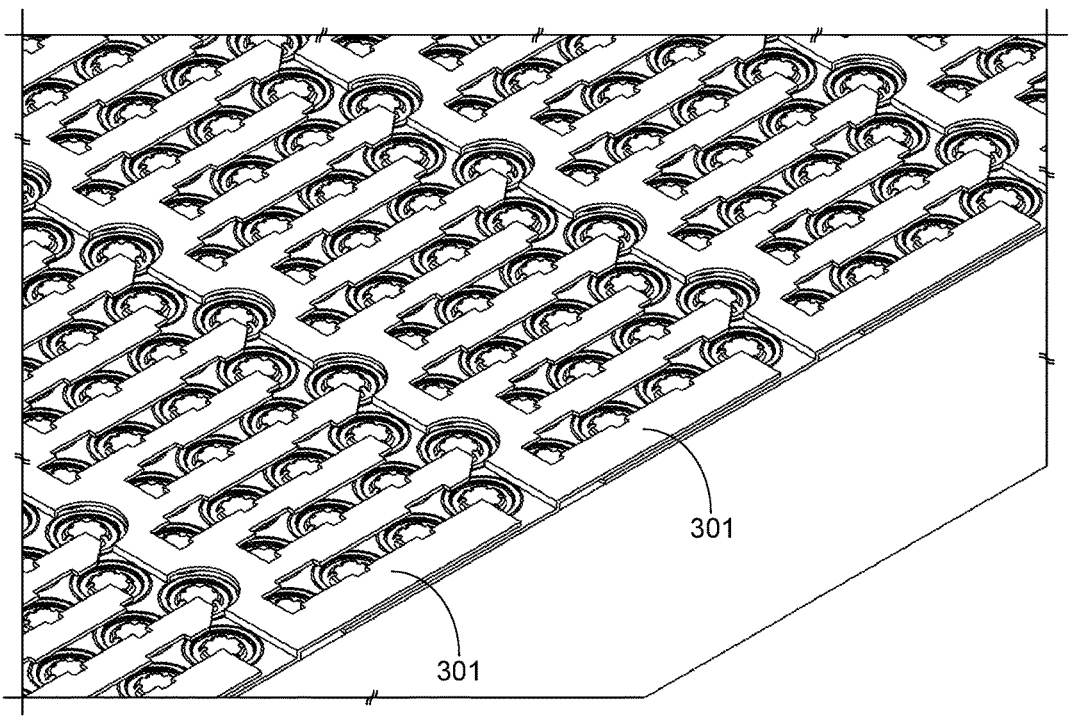
FIG. 3 provides a detailed perspective view of the bus bars in a particular layer stack configuration in accordance with the prior art.

Interposed between battery rows 405 are linear bus bars 407, where each bus bar 407 is devoid of the contact fingers utilized in the prior art approach shown in FIG. 3. Bus bars 407 are preferably made of copper, although other suitable electrically conductive materials such as aluminum may be used. While the invention may utilize any battery type that provides access to both terminals at a single end portion of the battery, in the preferred and illustrated embodiment batteries 401 are cylindrical, preferably utilizing an 18650 form factor.

The batteries within a single row 405 form a group with all terminals of a first polarity being electrically connected to a single bus bar on one side of the battery row, and all terminals of the second polarity being electrically connected to a single bus bar on the other side of the battery row. For example, all positive terminals of battery row 405A are electrically connected to bus bar 407A and all negative terminals of battery row 405A are electrically connected to bus bar 407B. As a result of this approach, each group of batteries represented by a single row are electrically connected in parallel while the battery rows within a single module 400 are electrically connected in series. By varying the number of batteries within a single row, as well as the number of rows within a single module, the desired voltage and current capabilities of the module may be configured as desired to meet the design criteria of the intended application.

In the preferred embodiment of the invention, the interconnects 409 that electrically couple the batteries 401 to the bus bars 407 are comprised of wire bonds. Interconnects 409 may be attached using any wire bonding technique suitable for the selected wire gauge, wire material and bus bar material. Typical wire bonding techniques include, but are not limited to, ultrasonic bonding, resistance bonding, thermocompression bonding and thermosonic bonding.

Figure 5:
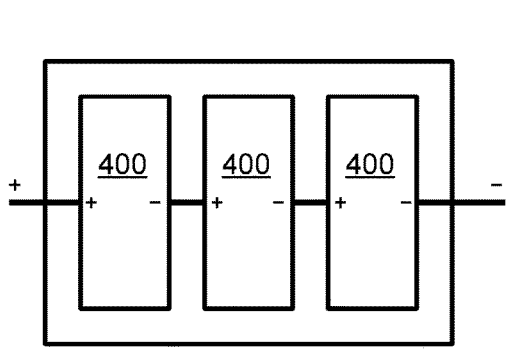
FIG. 5 provides a schematic diagram of a battery pack utilizing a plurality of the battery modules shown in FIG. 4 combined in a series configuration.
Figure 6:
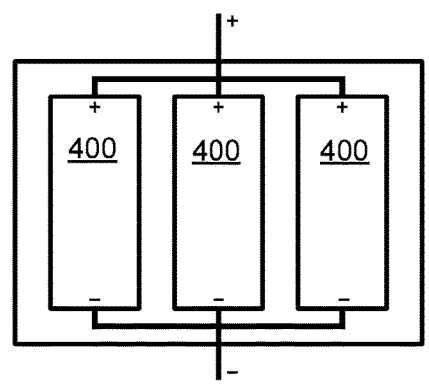
FIG. 6 provides a schematic diagram of a battery pack utilizing a plurality of the battery modules shown in FIG. 4 combined in a parallel configuration.

As previously noted, module 400 may be configured as the entire battery pack. For some applications, however, multiple modules 400 may be electrically interconnected in order to achieve the desired battery pack output characteristics. For example, modules 400 may be electrically interconnected in series as illustrated in FIG. 5, or electrically interconnected in parallel as illustrated in FIG. 6. Other series/parallel arrangements may be used with the invention.

Figure 7:
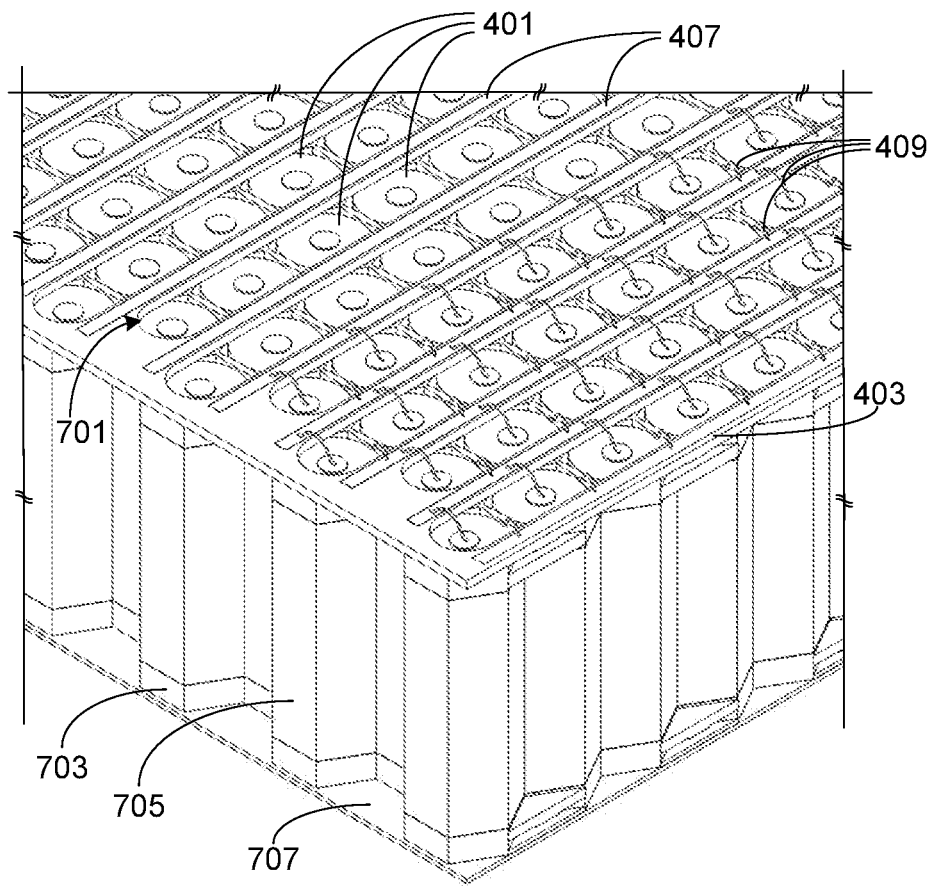
FIG. 7 provides a perspective view of a portion of a battery module such as that shown in FIG. 4.

FIG. 7 provides a perspective view of a portion of a battery module such as the module shown in FIG. 4. For clarity only a portion of the illustrated batteries shown in FIG. 7 are interconnected to adjacent bus bars. This figure shows a clearer view of the access apertures 701 fabricated into upper tray member 403, apertures 701 allowing access to the battery terminals located at the ends of the batteries. The access apertures 701 utilized in the illustrated embodiment are continuous slots that provide easy electrical access to all of the batteries within a single row while still holding the batteries in place. Thus in this configuration there is a single access aperture per battery group. It should be understood, however, that access apertures 701 may utilize an alternate shape and may be configured to allow access to more or less than a battery group. For example, the access apertures may be configured with a circular or elliptical shape with one opening per battery, or one opening per sub-group of batteries (e.g., two or more batteries).

Upper tray member 403, which may be molded, cast, printed using a 3D printer, or fabricated using an alternate technique, is preferably fabricated from a plastic (e.g., polycarbonate, acrylonitrile butadiene styrene (ABS), polypropylene (PP), polyethylene (PE), polyethylene terephthalate (PET), nylon, etc.), although other materials may also be used to fabricate the tray member. In a preferred embodiment, bus bars 407 are integrated into upper tray member 403, for example by molding the bus bars into the tray member during tray member fabrication. Alternately, bus bars 407 may be bonded into slots molded into the upper tray member 403. Integrating the bus bars into the upper surface of tray member 403 insures that the bus bars are properly positioned during the battery interconnection process, and that the bus bars do not move after battery pack fabrication as such movement would stress, and potentially damage, the battery interconnects. Additionally, by making the top surfaces of the bus bar and the tray member coplanar as desired and illustrated, there is no line-of-sight between a battery terminal and the bus bar. As a result, if a battery interconnect fuses, the risk of arcing between the affected battery and the adjacent bus bar is reduced.

Figure 8:
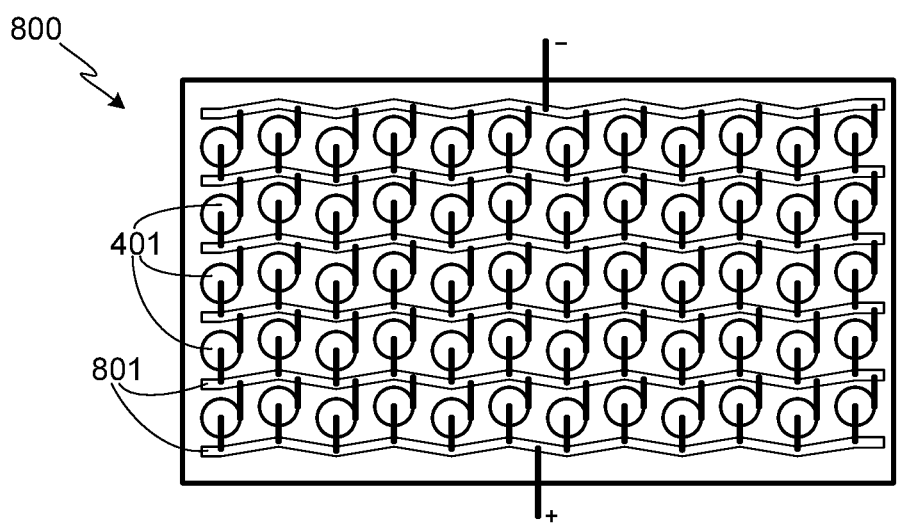
FIG. 8 provides a simplified view of a battery module in accordance with an alternate embodiment of the invention.

In the preferred and illustrated embodiment, bus bars 407 are linear, i.e., they are fabricated as straight bus bars and are devoid of contact fingers. As noted above, this approach simplifies module fabrication while reducing bus bar material, and thus cost and weight, of the pack. It will be appreciated that this configuration works best when the battery groups, e.g., battery rows 405, are also arranged linearly. If the battery groups are not arranged in a linear fashion, the bus bars may utilize a similar shape. For example and as illustrated in FIG. 8, if each row of batteries 401 are arranged in a non-linear fashion, bus bars 801 may utilize a similar curvilinear shape. In module 800, bus bars 801 utilize a zig-zag shape. However, as this configuration avoids the use of bus bar contact fingers and instead maintains bus bars of approximately uniform width, a relatively simple and cost effective configuration is still achieved.

Other aspects of a preferred embodiment of the invention are also shown in FIG. 7, specifically the lower tray member 703, the battery separating member 705 and the heat spreader 707. These other aspects are highlighted in FIGS. 9 and 10. It will be appreciated that the configuration of members 701, 703 and 705 assume the use of cylindrical cells, as preferred, and the use of an alternate form factor for batteries 401 would require the redesign of members 701, 703 and 705.

Figure 9:
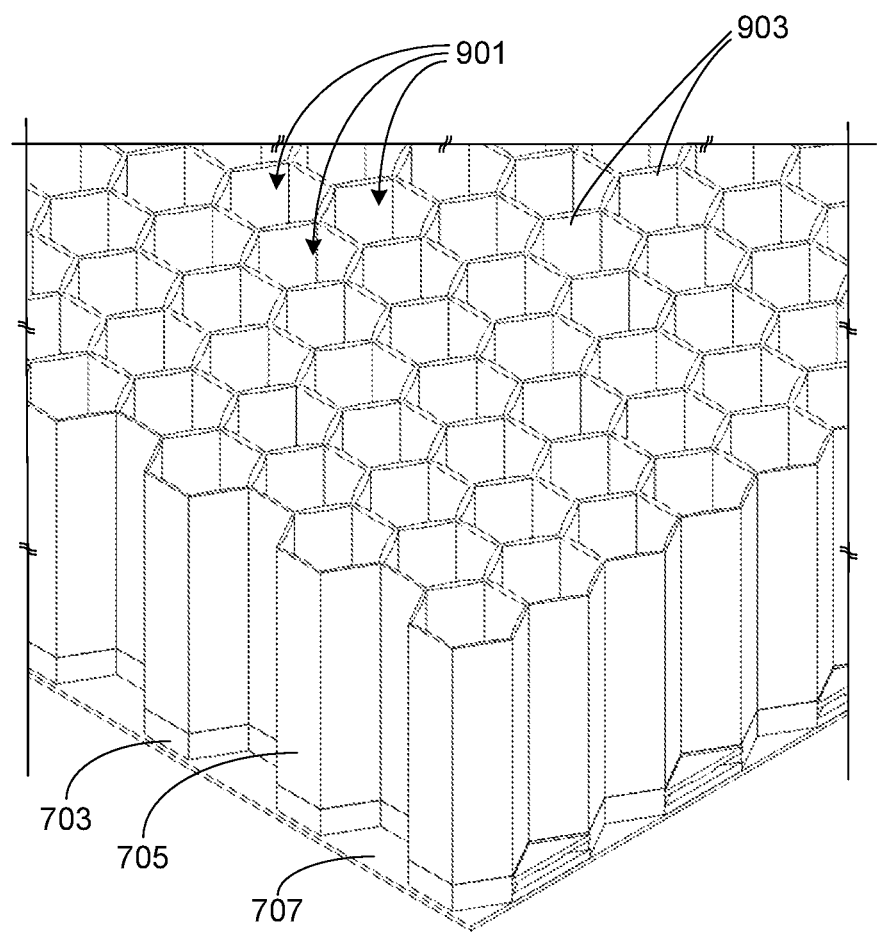
FIG. 9 provides a perspective view of the same portion of the battery module as shown in FIG. 8, with the upper tray member as well as the batteries removed.

FIG. 9 provides a clear view of the battery separating member 705. Separating member 705 is fabricated from an electrically insulating material, preferably a plastic such as a polycarbonate, acrylonitrile butadiene styrene (ABS), polypropylene (PP), polyethylene (PE), polyethylene terephthalate (PET), or nylon. In the preferred embodiment, member 705 is fabricated using an extrusion process, although alternate fabrication techniques may be used, such as molding, casting or printing using a 3D printer.

In the illustrated embodiment, each battery 401 is held within its own cavity 901 within separating member 705. The walls 903 of each battery cavity 901 may utilize any of a variety of shapes, such that each cavity may have either a circular or a non-circular cross-section. In the preferred embodiment, each battery cavity 901 is fabricated with a six-sided shape in which the six sides are of equal length (i.e., a six-sided, regular shape). Each wall 903 may be straight; alternately, each wall 903 may be curved outwardly away from the cavity center line; alternately, each wall 903 may be curved inwardly towards the cavity center line as shown.

Enclosing each battery within a six-sided, regular cavity, and more preferably a six-sided, regular cavity in which the cavity walls 903 curve inwardly towards the corresponding cavity center line as shown, provides several benefits. First, the cavities prevent the batteries from accidentally touching one another, either during battery pack fabrication and assembly or once the battery pack is installed. Assuming that the battery pack is installed in an electric vehicle, separating member 705 also helps to prevent battery shorting if the battery pack is damaged during a collision. Second, the use of a six-sided, regular cavity rather than a cavity with a circular cross-section simplifies battery pack assembly since the six-sided shape provides additional fitting flexibility, thereby allowing the fabrication tolerances for both the batteries and the separating member to be looser than would otherwise be required. Third, the air space provided by the six-sided battery cavities improves battery-to-battery thermal isolation. Fourth, the contraction and expansion that batteries often exhibit during thermal cycling is more easily handled by a six-sided cavity rather than a circularly-shaped cavity. Fifth, the space between the corners of a six-sided cavity and a cylindrically-shaped battery provide venting pathways if the battery vents through its side, for example during a thermal runaway event.

Figure 10:
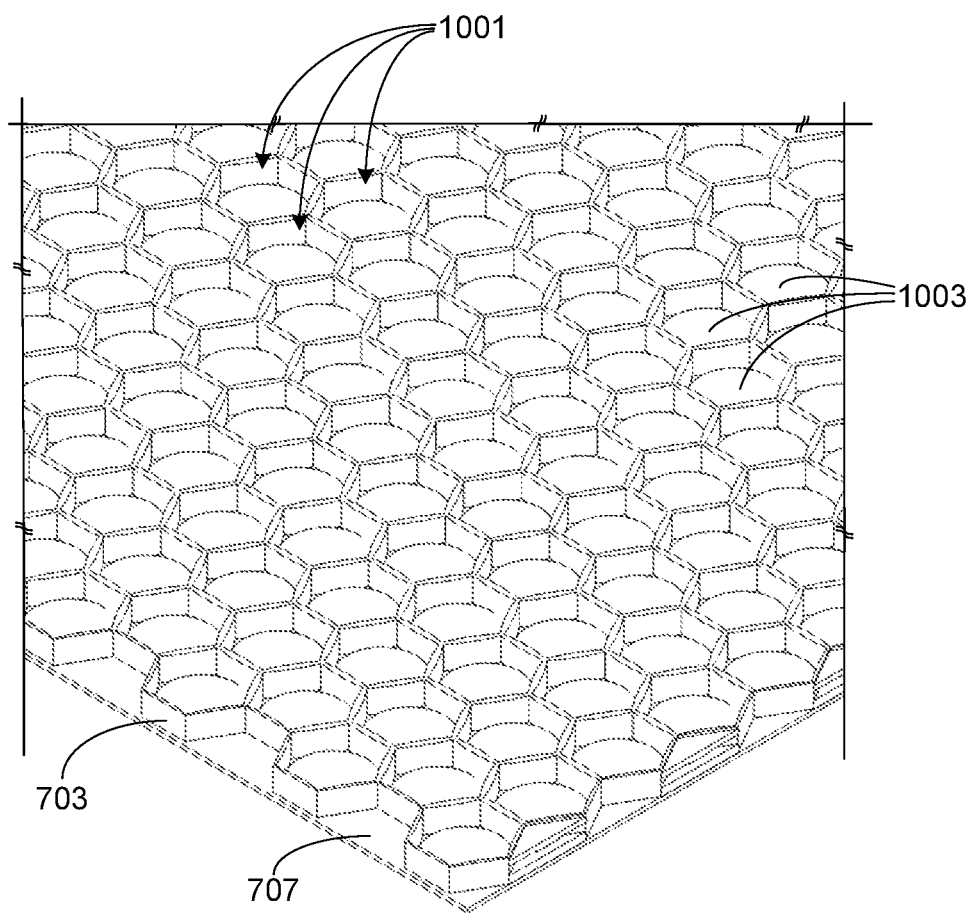
FIG. 10 provides a perspective view of the same portion of the battery module as shown in FIGS. 8 and 9, with the upper tray member, battery separating member and the batteries removed.

FIG. 10 provides a view of the lower tray member 703 and heat spreader 707.

Tray member 703 is typically fabricated from the same electrically insulating material as that used for member 705, although a different electrically insulating material may be used. Preferably member 703 is fabricated from a plastic (e.g., polycarbonate, acrylonitrile butadiene styrene (ABS), polypropylene (PP), polyethylene (PE), polyethylene terephthalate (PET), or nylon). Member 703 may be molded, for example using injection molding, although other fabrication techniques may be used. Preferably the six-sided cavities used in battery separating member 705 are continued via cavities 1001 through tray member 703. Cavities 1001 pass completely through tray member 703, thereby allowing good thermal contact to be made between batteries 401 and the underlying thermally conductive heat spreader 707. In the preferred embodiment member 707 is fabricated from aluminum, although it should be understood that spreader 707 may be fabricated from other thermally conductive materials. Preferably heat spreader 707 has a thermal conductivity of at least 100 $Wm^{-1}K^{-1}$.

In order to achieve the desired level of heat withdrawal, the lowermost surface of each battery 401, and more preferably the lower portion of each battery 401, is thermally coupled to the heat spreader 707 using a layer 1003 of a thermally conductive material, for example a thermally conductive epoxy, where the selected material preferably has a thermal conductivity of at least 0.75 $Wm^{-1}K^{-1}$, more preferably of at least 2.0 $Wm^{-1}K^{-1}$, still more preferably of at least 5.0 $Wm^{-1}K^{-1}$, yet still more preferably of at least 10.0 $Wm^{-1}K^{-1}$, and yet still more preferably of at least 20.0 $Wm^{-1}K^{-1}$. Heat withdrawal from the batteries is enhanced by thermally coupling the lower portion of each battery to the heat spreader 707 via layers 1003 as preferred, rather than simply interposing layers 1003 between the lowermost surface of each battery and the heat spreader. While layers 1003 are preferably comprised of a thermally conductive epoxy as noted above, the inventor envisions the use of other materials as well (e.g., a ceramic). Although not shown in the figures, preferably heat is withdrawn from the heat spreader via either an air cooled heat sink or a heat transfer liquid contained in a series of cooling conduits that are in thermal contact with the lowermost surface of heat spreader 707.

The material comprising each layer 1003 is selected to have a relatively high electrical resistivity, preferably on the order of at least $10^{12}$ ohm-cm, thus electrically isolating the batteries from the underlying heat spreader 707. Although not required, in at least one configuration of the invention, and as described in detail in co-pending and co-assigned U.S. patent application Ser. No. 14/331,300 the disclosure of which is incorporated herein for any and all purposes, a plurality of electrically non-conductive granules, for example fabricated from alumina or silica, are dispersed within layers 1003. As a result of the granules, even if layers 1003 soften, the granules help prevent the batteries from contacting the underlying heat spreader.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A battery assembly, comprising:
   a plurality of batteries, each battery of said plurality of batteries comprising a first terminal at a first end portion of said battery and a second terminal at said first end portion of said battery, wherein said plurality of batteries are divided into a plurality of battery groups, each battery group of said plurality of battery groups comprising a subset of said plurality of batteries, wherein said batteries within each subset of said plurality of batteries are electrically connected in parallel, and wherein said battery groups of said plurality of battery groups are electrically connected in series;
   an upper tray member, wherein said upper tray member captures said first end portion of each battery of said plurality of batteries, said upper tray member further comprising a plurality of apertures, wherein said plurality of apertures provide access to said first terminal and to said second terminal of each battery of said plurality of batteries; and
   a plurality of bus bars attached to an upper surface of said upper tray member, wherein said plurality of batteries are electrically interconnected only via said plurality of bus bars attached to said upper surface of said upper tray member, wherein said plurality of bus bars are non-overlapping, wherein said plurality of bus bars are devoid of contact fingers, wherein said plurality of bus bars are configured in an alternating pattern with said plurality of battery groups, wherein said alternating pattern alternates a single bus bar of said plurality of bus bars with a single battery group of said plurality of battery groups such that only one bus bar is adjacent to either side of each battery group, wherein a first set of said bus bars are of a first polarity and wherein a second set of said bus bars are of a second polarity, wherein said plurality of bus bars attached to said upper surface of said upper tray member alternate between said first polarity and said second polarity, wherein each battery of a corresponding battery group is electrically connected via said first terminal to one bus bar of said first set of bus bars adjacent to a first side of said corresponding battery group and electrically connected via said second terminal to one bus bar of said second set of bus bars adjacent to a second side of said corresponding battery group.

2. The battery assembly of claim 1, wherein said plurality of bus bars are straight and of approximately uniform thickness and of approximately uniform width.

3. The battery assembly of claim 1, wherein an upper surface of each bus bar of said plurality of bus bars is coplanar with said upper surface of said upper tray member.

4. The battery assembly of claim 1, wherein each bus bar of said plurality of bus bars is molded into said upper surface of said upper tray member.

5. The battery assembly of claim 1, wherein each bus bar of said plurality of bus bars is bonded to said upper surface of said upper tray member.

6. The battery assembly of claim 1, further comprising a lower tray member comprising a second plurality of apertures corresponding to said plurality of batteries, wherein said lower tray member captures a second end portion of each battery of said plurality of batteries.

7. The battery assembly of claim 1, further comprising a battery separating member, said battery separating member comprising a plurality of cavities corresponding to said plurality of batteries, wherein said first end portion of each of said plurality of batteries extends out of a first side of said battery separating member and is captured by said upper tray member, and wherein each cavity of said plurality of cavities has six sides.

8. The battery assembly of claim 7, wherein each side of said six sides is straight, and wherein said six sides are of equal length.

9. The battery assembly of claim 7, wherein each side of said six sides curves inward towards a corresponding cavity centerline.

10. The battery assembly of claim 7, wherein each side of said six sides curves outward away from a corresponding cavity centerline.

11. The battery assembly of claim 1, said plurality of apertures comprising a single aperture per corresponding battery group, said single aperture providing access to said first terminal and said second terminal of each battery of said corresponding battery group.

12. The battery assembly of claim 1, wherein each of said plurality of batteries is cylindrical, wherein said first terminal is comprised of a battery positive terminal, and wherein said second terminal is comprised of a battery casing.

13. The battery assembly of claim 1, further comprising a plurality of wire bonds that electrically connect said plurality of batteries to said plurality of bus bars.

14. The battery assembly of claim 13, wherein said plurality of wire bonds are coupled to said plurality of batteries and to said plurality of bus bars utilizing a bonding technique selected from the group consisting of ultrasonic bonding, resistance bonding, thermocompression bonding and thermosonic bonding.

* * * * *